(12) United States Patent
Bryant

(10) Patent No.: US 6,386,880 B2
(45) Date of Patent: May 14, 2002

(54) NUMERICAL PROBLEM SOLVING GAME

(76) Inventor: Wilbert Bryant, 93-10 214th St., Queens Village, NY (US) 11428

( * ) Notice: Subject to any disclaimer, the term of this patent is extended or adjusted under 35 U.S.C. 154(b) by 0 days.

(21) Appl. No.: 09/866,946

(22) Filed: May 29, 2001

Related U.S. Application Data

(60) Provisional application No. 60/207,754, filed on May 30, 2000.

(51) Int. Cl.[7] ................................................ G09B 23/02
(52) U.S. Cl. ...................... 434/188; 434/191; 434/322; 273/153 R; 273/272
(58) Field of Search ................................. 434/188, 191, 434/322, 326, 353; 273/272, 153 R, 429, 430, 431

(56) References Cited

U.S. PATENT DOCUMENTS

| | | | | | |
|---|---|---|---|---|---|
| 1,610,806 A | * | 12/1926 | Moore | ..................... | 273/153 R |
| 1,625,218 A | * | 4/1927 | Lundy | ..................... | 273/153 R |
| 1,629,601 A | * | 5/1927 | Trbojevich | .............. | 273/153 R |
| 2,517,115 A | * | 8/1950 | Kelly | ..................... | 273/153 R |
| 3,602,513 A | * | 8/1971 | Breen | ..................... | 273/153 R |
| 4,171,815 A | * | 10/1979 | Sturtz | ......................... | 273/272 |
| 4,512,581 A | * | 4/1985 | Levine | ................... | 273/153 R |
| 4,728,294 A | * | 3/1988 | Bredehorn | .............. | 273/153 R |
| 5,669,611 A | * | 9/1997 | Fedele | ......................... | 273/431 |
| 5,679,002 A | * | 10/1997 | Scelzo | ......................... | 273/241 |

* cited by examiner

Primary Examiner—Kien T. Nguyen
(74) Attorney, Agent, or Firm—Goldstein Law Offices, P.C.

(57) ABSTRACT

A numerical problem solving game including a set of questions and a scrambled letter puzzle grid. Each of the questions calls for a numerical answer. The puzzle grids comprise a plurality of letters which spell out verbal representations of the numerical answers. Each of the jumbled letter grids corresponds directly with the single set of numerical questions whereby numerical answers for the single set of mathematical questions can be found in verbal form within the single jumbled letter grid.

5 Claims, 4 Drawing Sheets

NUMERICAL PROBLEM SOLVING GAME

CROSS REFERENCES AND RELATED SUBJECT MATTER

The invention relates to subject matter contained in provisional patent application serial No. 60/207,754, filed in the United States Patent Office on May 30, 2000.

BACKGROUND OF THE INVENTION

The present invention relates to a numerical problem solving game and more particularly pertains to asking numerical questions and providing the answer in puzzle form.

Educating children has always been a difficult task. Most children do not stay interested long enough to learn certain topics and skills. One must always search for a new and interesting way to try and educate children. The use of games has been a very successful tool in educating because children believe they are having fun while at the same time they are learning.

Math skills are on the decline. Many attempts to combine math skills into game form have failed because of the disinterest shown by children. What is needed is a game that will incorporate math skills and will ensure that a child remains actively interested while participating.

The present invention attempts to solve the aforementioned problems by providing a numerical problem solving game that utilizes a jumbled letter grid that will provide the answers to given math question or other question which calls for a numerical answer. Thus, the child will attempt to answer the math question, and then search through the grid to find out if their answer is correct.

The use of games for amusement purposes is known in the prior art. More specifically, games for amusement purposes heretofore devised and utilized for the purpose of providing amusement are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,171,815 to Sturtz discloses a word forming game comprised of a game board with crossword puzzle inserts. U.S. Pat. No. 4,586,707 to McNeight discloses a game in which the answers to a set of questions are given as numbers. U.S. Pat. No. 5,679,002 to Scelzo and U.S. Pat. No. 5,669,611 to Fedele disclose additional mathematical game for education and amusement purposes.

While these devices fulfill their respective, particular objective and requirements, the aforementioned patents do not describe a mathematical problem solving game for asking mathematical or numerical questions and providing the answer in puzzle form.

In this respect, the numerical problem solving game according to the present invention substantially departs from the conventional concepts and designs of the prior art, and in doing so provides an apparatus primarily developed for the purpose of asking numerical questions and providing the answer in puzzle form.

Therefore, it can be appreciated that there exists a continuing need for new and improved mathematical problem solving game which can be used for asking mathematical questions and providing the answer in puzzle form. In this regard, the present invention substantially fulfills this need.

SUMMARY OF THE INVENTION

In the view of the foregoing disadvantages inherent in the known types of games for amusement purposes now present in the prior art, the present invention provides an improved numerical problem solving game. As such, the general purpose of the present invention, which will be described subsequently in greater detail, is to provide a new and improved numerical and mathematical problem solving game and method which has all the advantages of the prior art and none of the disadvantages.

To attain this, the present invention essentially comprises a book comprised of a plurality of pages. A plurality of sets of questions are disposed on the various of pages in the book. Each of the questions calls for a numerical answer. A plurality of sets of jumbled letter grids are disposed on the plurality of pages of the books. Each of the jumbled letter grids corresponds directly with a single set of numerical questions whereby numerical answers for the single set of mathematical questions can be found in verbal form within the single jumbled letter grid.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved numerical problem solving game which has all the advantages of the prior art games for mathematical teaching and amusement purposes and none of the disadvantages.

It is another object of the present invention to provide a new and improved numerical problem solving game which may be easily and efficiently manufactured and marketed.

An even further object of the present invention is to provide a new and improved mathematical problem solving game which is susceptible of a low cost of manufacture with regard to both materials and labor, and which accordingly is then susceptible of low prices of sale to the consuming public, thereby making such a mathematical problem solving game economically available to the buying public.

Even still another object of the present invention is to provide a new and improved mathematical problem solving game for asking numerical questions and providing the answer verbally in puzzle form.

Lastly, it is an object of the present invention to provide a new and improved mathematical problem solving game generally embodied within a book comprised of a plurality of pages. A plurality of sets of questions are disposed on the various of pages in the book. Each of the questions calls for a numerical answer. A plurality of sets of jumbled letter grids are disposed on the plurality of pages of the books. Each of the jumbled letter grids corresponds directly with a single set of numerical questions whereby numerical answers for the single set of mathematical questions can be found in verbal form within the single jumbled letter grid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various drawing figures.

DESCRIPTION OF THE PREFERRED EMBODIMENT

With reference now to the drawings, and in particular, to FIGS. 1 through 5 thereof, the preferred embodiment of the new and improved numerical problem solving game embodied in book form, according to the principles and concepts of the present invention and generally designated by the reference number 10 will be described.

Specifically, it will be noted in the various Figures that the device relates to a numerical problem solving game for asking numerical questions and providing the answer verbally in puzzle form. In its broadest context, the device comprises a book, a plurality of pages, a plurality of sets of questions, and a plurality of sets of scrambled puzzle letter grids. Such components are individually configured and correlated with respect to each other so as to attain the desired objective.

Figure 2:
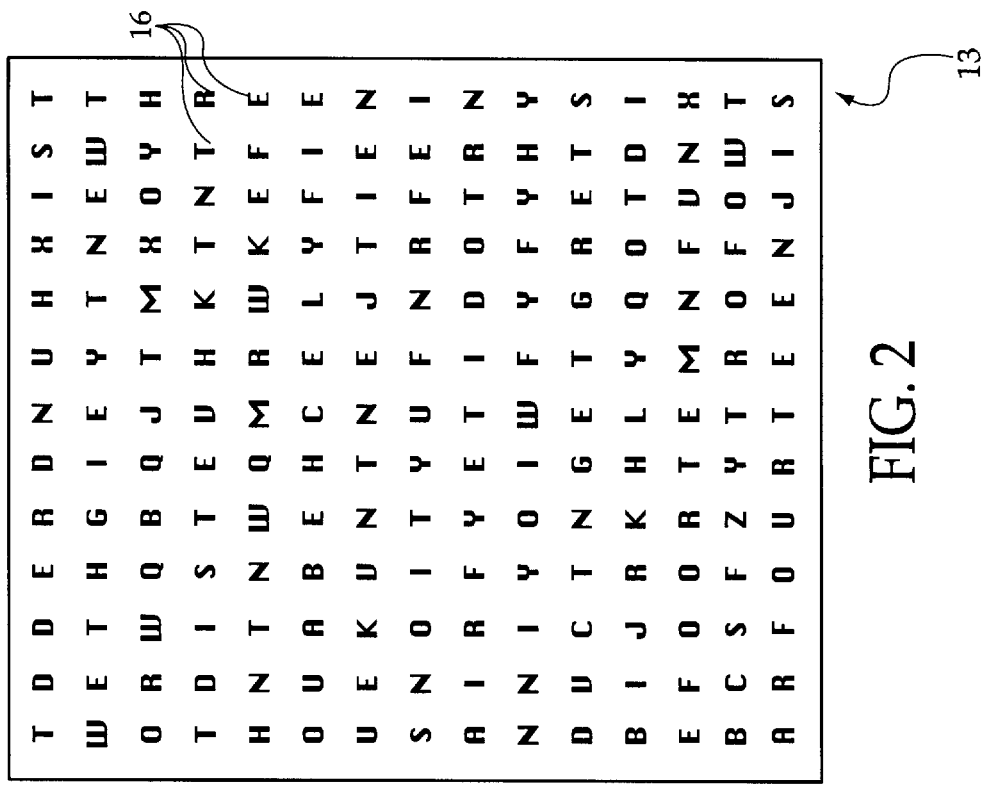
FIG. 2 is a plan view of an example of one of the puzzle grids of the present invention.
Figure 1:
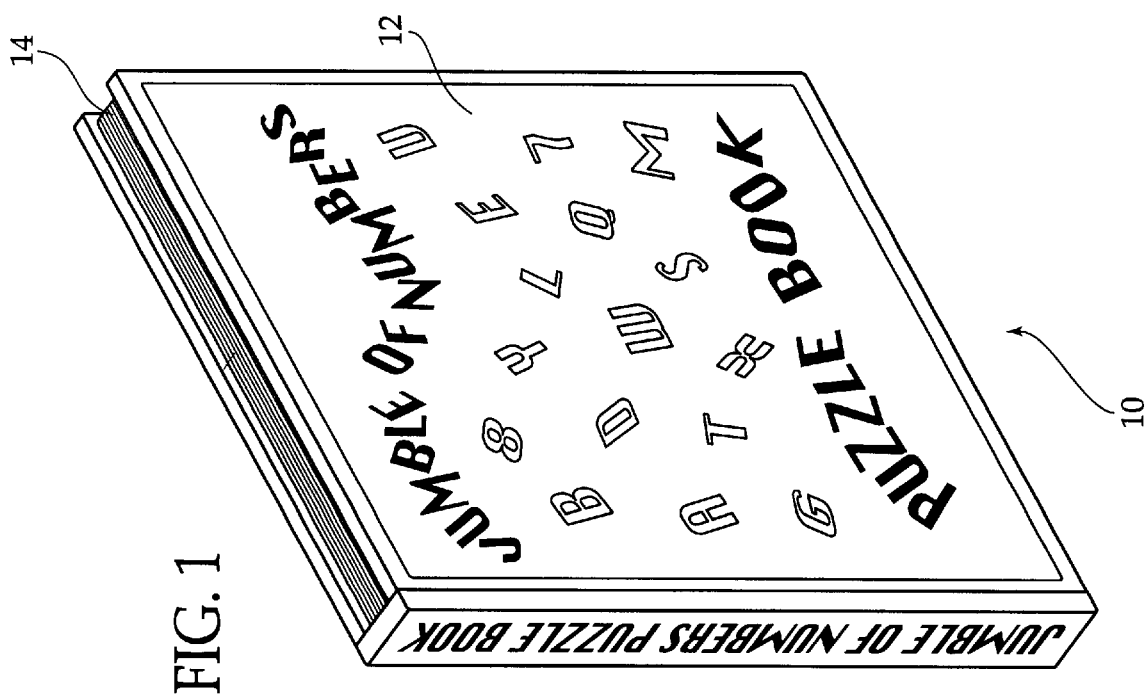
FIG. 1 is a perspective view of the preferred embodiment of the numerical problem solving game embodied in a book form in accordance with the principles of the present invention.

The book 12 is comprised of a plurality of pages 14. The book 12, as illustrated in FIG. 1, can be constructed in a hard bound form, or alternately, a paper back style. In addition, the principles of the present invention can be applied to computerized versions of the puzzle. The indicia on the front cover of the book 12 should clearly define its contents.

The plurality of sets of numerical questions 15 are disposed on the plurality of pages 14 in the book 12. The numerical questions are any questions which call for a numerical answer. They can be trivia questions which simply call for a numerical answer, or could be any type of math problem ranging greatly in degree of difficulty. Different levels of difficulties could be provided in a single book or in separate books for player/users with different skill levels.

Figure 3:
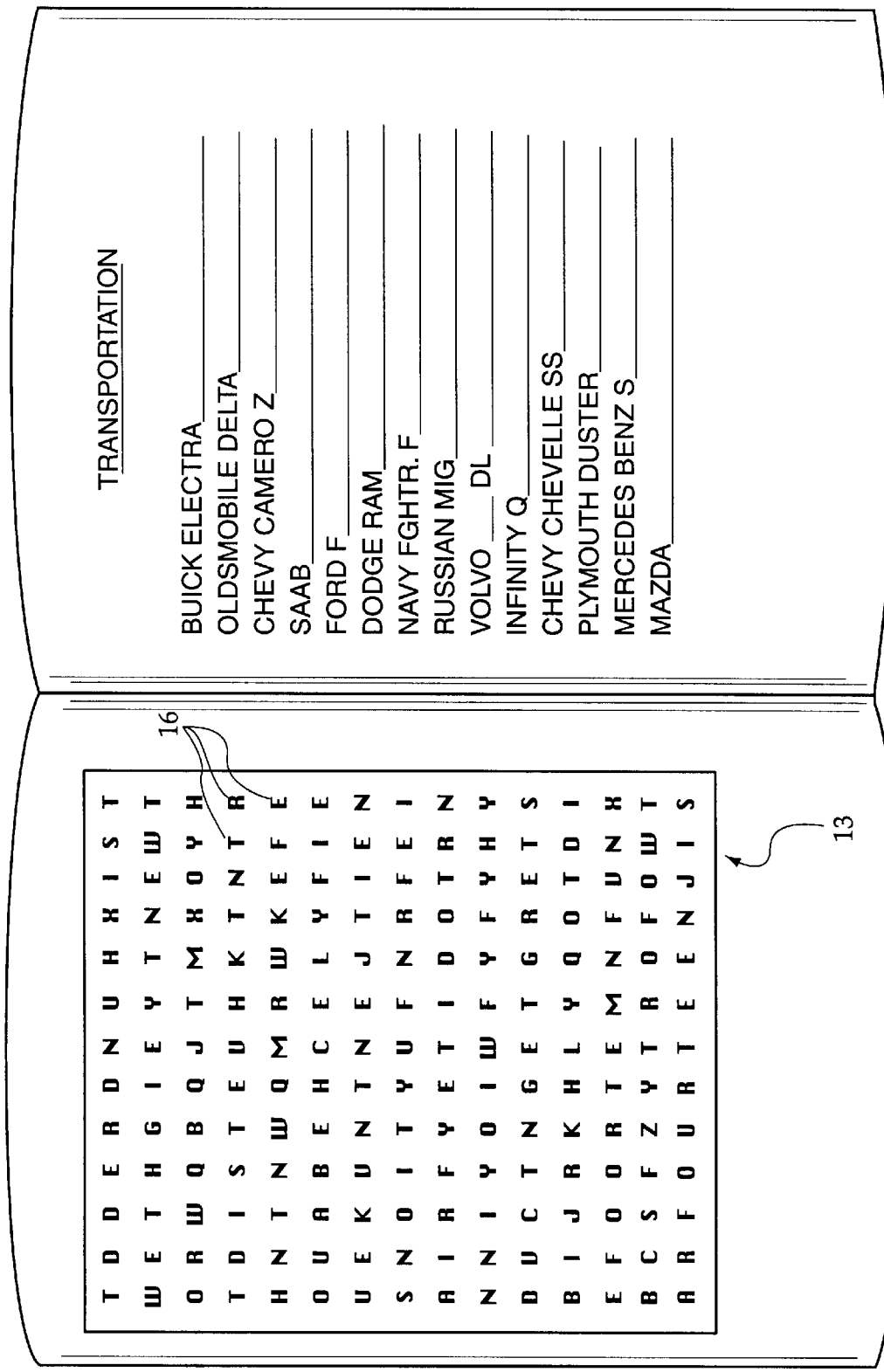
FIG. 3 is a top plan view of an exemplative puzzle grid, along with exemplative questions which correspond with the puzzle grid.

The plurality of sets of scrambled letter or puzzle grids 13 are disposed on the plurality of pages 14 of the books 12. Note FIG. 2, wherein the puzzle grid 13 is shown as having a plurality of individual letters 16, evenly spaced apart in grid form. The letters spell out verbal representations of numbers. Referring to FIG. 3, any single jumbled letter grid 13 corresponds directly with a single set of numerical questions 15 whereby answers for the single set of mathematical questions can be found in verbal form within the associated single jumbled letter grid 13. The grid 16 can arrange the answers to the questions in any order selected from vertically, horizontally, diagonally, and in reverse order of spelling in any of said directions. Not only will this teach mathematic skills, as well as general knowledge, but it will also teach children how to properly spell the numbers.

Figure 4:
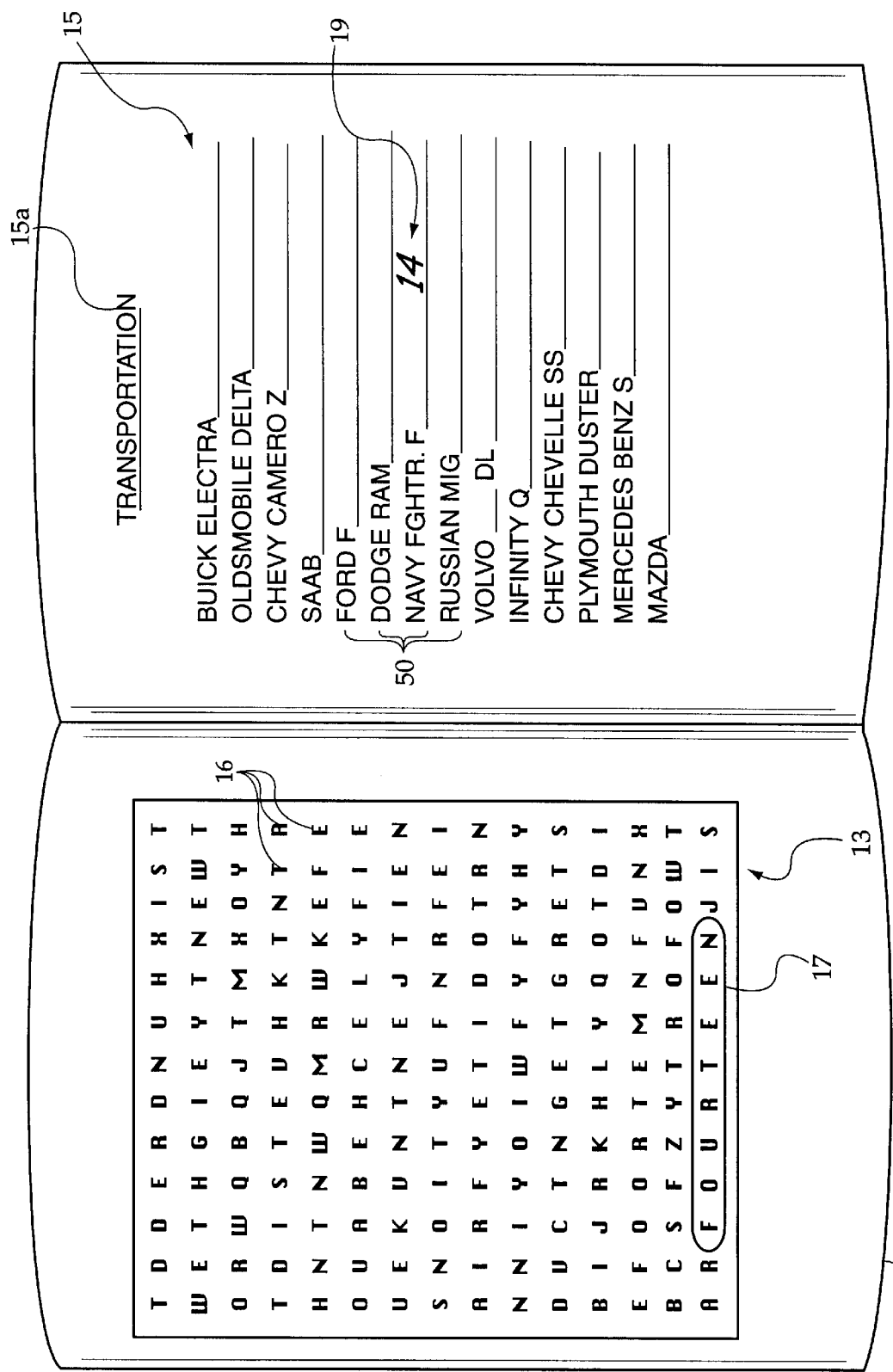
FIG. 4 is a top plan view similar to FIG. 3, except wherein a player is in the process of answering the numerical questions using the puzzle grid.
Figure 5:
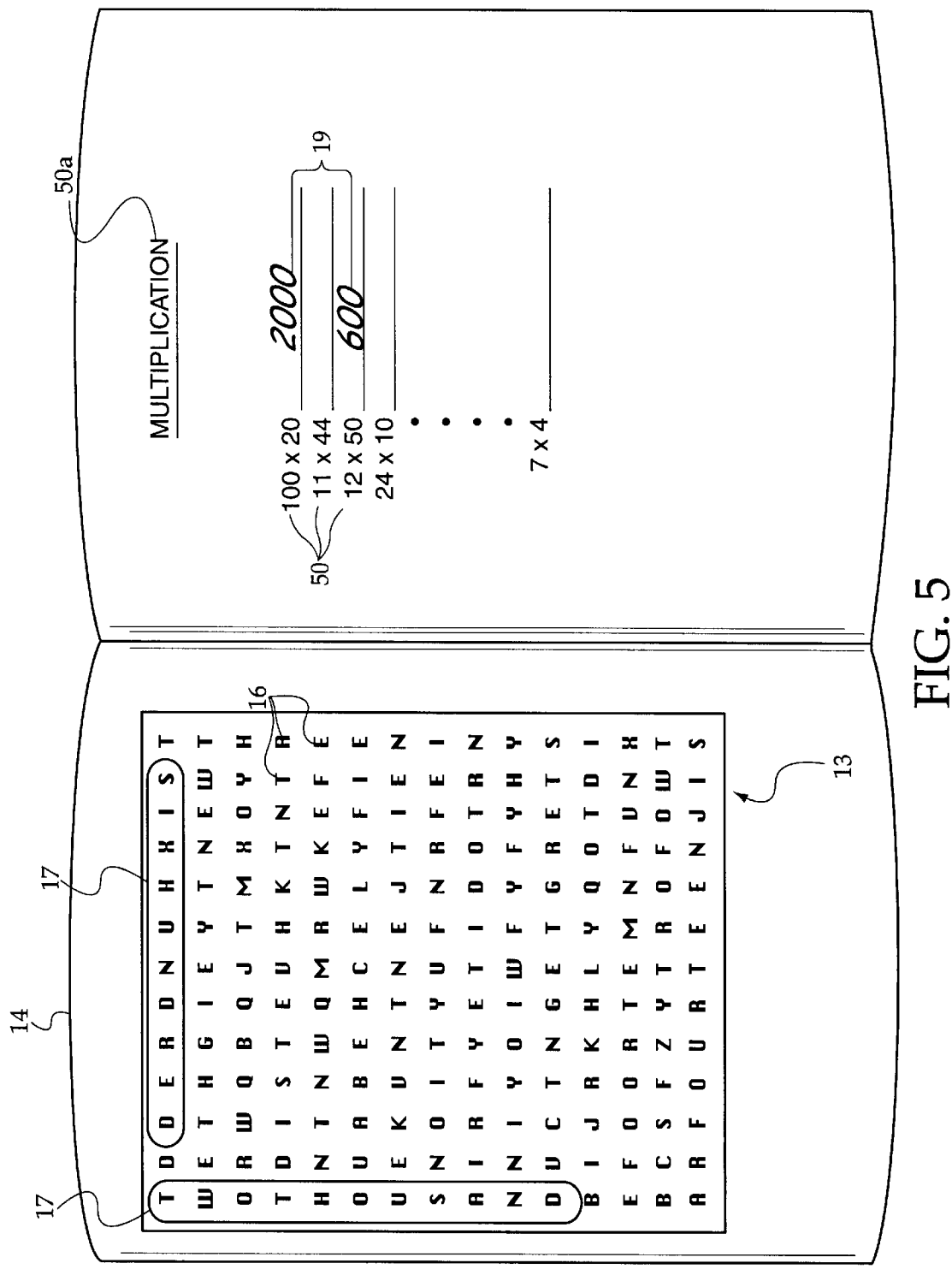
FIG. 5 is a top plan view of another exemplative set of numerical questions, wherein the player is in the process of answering mathematical questions using the puzzle grid.

As seen in FIG. 3, each set of numerical question 15 comprises numerous individual questions 50, which each call for a verbal answer. The theme of the set of numerical questions 15 in FIG. 4 and FIG. 5 is "TRANSPORTATION", as indicated by a legend 15A. Referring specifically to FIG. 4, the player has located a verbal answer 17 within the puzzle grid 15. The verbal answer 17 located is "FOURTEEN". The player then determines that "14" is the answer to the question 50 among the set of questions 15 "NAVY FIGHTER F__". The player then writes in "14" as a numerical answer 19 to said question 50. The player can choose to play the game in either order: searching for verbal answers 17 within the puzzle grid 13 first and then locating the appropriate question 50, or answering the questions 50 and then locating the corresponding verbal answers 17 within the puzzle grid.

FIG. 5 illustrates a further embodiment, wherein the numerical questions 50 are more specifically mathematical questions. In particular, a set of multiplication questions are presented, as indicated by the legend "MULTIPLICATION". Several examples are illustrated, wherein the verbal clue "TWO THOUSAND" provides the answer to the question "100×20__". In addition, another question "12×50" is answered by the verbal clue 17: "SIX HUNDRED", which is reversed within the associated puzzle grid 13.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. A numerical problem solving game, comprising:

a puzzle grid, comprising a plurality of individual letters, the letters evenly spaced from each other and forming a grid, within the grid verbal representations of numbers are spelled out;

a set of questions, the questions each calling for a numerical answer, the questions directly associated with the puzzle grid such that the numerical answer for each of the questions directly corresponds with one of the verbal representations of the numerical answer found within the puzzle grid.

2. The numerical problem solving game as recited in claim 1, wherein the verbal representations of numbers are arranged within the grid at least one of horizontally, vertically, diagonally, and reversed in said horizontal, vertical, or diagonal directions.

3. The numerical problem solving game as recited in claim 2, wherein the questions are mathematical problems wherein the answers to said mathematical problems are provided in verbal representations of said answers within the puzzle grid.

4. A numerical problem solving game using a puzzle grid made up ,of individual letters spelling numerical representations of numbers, a set of mathematical questions which call for numerical answers, comprising the steps of:

determining the numerical answer to one of the questions; and searching the puzzle grid for a verbal representation of said numerical answer.

5. A numerical problem solving game using a puzzle grid made up of individual letters spelling numerical representations of numbers, a set of mathematical questions which call for numerical answers, comprising the steps of:

searching the puzzle grid to locate verbal representations of numbers; and reviewing the questions to determine which of said questions is properly answered by the number located in verbal form within the puzzle grid.

* * * * *